United States Patent
Handley

(10) Patent No.: US 7,962,542 B2
(45) Date of Patent: Jun. 14, 2011

(54) METHOD AND APPARATUS FOR INVERSE DISCRETE COSINE TRANSFORM

(75) Inventor: Maynard Handley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 802 days.

(21) Appl. No.: 10/934,043

(22) Filed: Sep. 3, 2004

(65) Prior Publication Data

US 2005/0033788 A1  Feb. 10, 2005

Related U.S. Application Data

(63) Continuation of application No. 09/756,970, filed on Jan. 9, 2001, now Pat. No. 6,799,192.

(51) Int. Cl.
*G06F 17/14* (2006.01)
(52) U.S. Cl. ........................... 708/402; 708/400
(58) Field of Classification Search ........... 708/400–409
See application file for complete search history.

(56) References Cited

U.S. PATENT DOCUMENTS

| | | | |
|---|---|---|---|
| 5,387,982 A * | 2/1995 | Kitaura et al. | 708/401 |
| 5,555,321 A * | 9/1996 | Ogura et al. | 382/235 |
| 5,576,958 A * | 11/1996 | Kawakatsu et al. | 708/402 |
| 5,917,736 A * | 6/1999 | Murata et al. | 708/401 |
| 6,052,415 A * | 4/2000 | Carr et al. | 375/240.12 |
| 6,167,092 A * | 12/2000 | Lengwehasatit | 708/402 |
| 6,181,831 B1 * | 1/2001 | Sadjadian | 708/402 |
| 6,421,695 B1 * | 7/2002 | Bae et al. | 708/402 |

OTHER PUBLICATIONS

Notice of Allowance of U.S. Appl. No. 09/756,970, May 17, 2004 (mailing date), Handley, Maynard.
Final Office Action of U.S. Appl. No. 09/756,970, Dec. 3, 2003 (mailing date), Handley, Maynard.
Non-Final Office Action of U.S. Appl. No. 09/756,970, Jul. 30, 2003 (mailing date), Handley, Maynard.

* cited by examiner

*Primary Examiner* — Chat C Do
(74) *Attorney, Agent, or Firm* — Adeli & Tollen LLP

(57) ABSTRACT

A method of implementing a two-dimensional Inverse Discrete Cosine Transform on a block of input data. The method includes 1) generating a performance array for the columns of the input data; 2) performing a column-wise IDCT upon the input data, the IDCT performed in accordance with cases given for each of the columns by the performance array; (3) generating a row performance offset for rows of the input data; and 4) performing a row-wise IDCT upon the result data from the performing of the column-wise IDCT.

39 Claims, 8 Drawing Sheets

|   | 1 | 2 | 3 | 4 | 5 | 6 | 7 | 8 |
|---|---|---|---|---|---|---|---|---|
| 1 | r11 | r21 | r31 | r41 | r51 | 0 | 0 | 0 |
| 2 | r12 | r22 | 0 | r42 | 0 | 0 | 0 | 0 |
| 3 | r13 | r23 | r33 | 0 | 0 | 0 | 0 | 0 |
| 4 | r14 | 0 | 0 | 0 | 0 | 0 | 0 | 0 |
| 5 | r15 | 0 | 0 | 0 | 0 | 0 | 0 | 0 |
| 6 | r16 | r26 | 0 | 0 | 0 | 0 | 0 | 0 |
| 7 | r17 | 0 | 0 | 0 | 0 | 0 | 0 | 0 |
| 8 | 0 | 0 | 0 | 0 | 0 | 0 | 0 | 0 | array of recovered values 500

| column # | 1 | 2 | 3 | 4 | 5 | 6 | 7 | 8 |
|---|---|---|---|---|---|---|---|---|
|  | 7 | 6 | 3 | 2 | 1 | 0 | 0 | 0 | performance array 510

FIG. 5

|   | 1 | 2 | 3 | 4 | 5 | 6 | 7 | 8 |
|---|---|---|---|---|---|---|---|---|
| 1 | c11 | c21 | c31 | c41 | c51 | 0 | 0 | 0 |
| 2 | c12 | c22 | 0 | c42 | 0 | 0 | 0 | 0 |
| 3 | c13 | c23 | c33 | c43 | c53 | 0 | 0 | 0 |
| 4 | c14 | c24 | c34 | c44 | 0 | 0 | 0 | 0 |
| 5 | c15 | c25 | 0 | 0 | 0 | 0 | 0 | 0 |
| 6 | c16 | c26 | 0 | 0 | 0 | 0 | 0 | 0 |
| 7 | c17 | 0 | 0 | 0 | 0 | 0 | 0 | 0 |
| 8 | c18 | c28 | c38 | 0 | 0 | 0 | 0 | 0 | result of column-wise IDCT 600

| 5 | row performance offset 610

FIG. 6

METHOD AND APPARATUS FOR INVERSE DISCRETE COSINE TRANSFORM

CROSS REFERENCE TO RELATED APPLICATIONS

This patent application claims benefit to and is a continuation of the United States Patent Application entitled "Method And Apparatus For Inverse Discrete Cosine Transform," having Ser. No. 09/756,970 filed on Jan. 9, 2001 now U.S. Pat. No. 6,799,192.

BACKGROUND

1. Field of the Invention

The present invention relates to image/document processing. More specifically, the present invention relates to performing the inverse discrete cosine transform.

2. Description of Related Art

Motion video and still image compression algorithms such as those based on JPEG (Joint Photographic Experts Group), DV (Digital Video) and MPEG (Motion Picture Experts Group) perform as part of the coding of images what is commonly known as a FDCT (Forward Discrete Cosine Transform). JPEG, for instance, compresses an image frame by considering independent sub-frames (for instance, Red, Green and Blue channels, each in its own sub-frame) of component channels in the image. Most such image compression schemes use "block-based" coding wherein the image sub-frame or frame is subdivided into blocks of 8 by 8 (or, sometimes, 16 by 16) pixels. A FDCT is performed on each block generating a new 8 by 8 block of values representing the energy of block at various spatial frequencies. The resulting 8 by 8 block is then "quantized" by mapping a given range of values which are possible within the transformed image to a smaller range of values. For instance, simple linear quantization would divide each FDCT pixel value by a scaling factor. The result of this quantization process is a set of values that are likely to contain a large number of zeroes. After quantization, the data is then encoded (for instance, using entropy encoding techniques) and stored in its final compressed form.

When decompressing the compressed image, the process described above is reversed. Thus, after unpacking the data and decoding it into its quantized form, the set of quantized spatial frequencies are inverse quantized by multiplying them by the same scaling factor(s) used during quantization. The resulting recovered values which closely approximate the original values are then subjected to an Inverse Discrete Cosine Transform (IDCT) to convert from spatial frequencies back to pixel component values. The IDCT is usually performed on the same size (8 by 8) blocks of the recovered values. The recovered values ordinarily contain a large number of zeroes and when done in blocks, the IDCT must be performed in a two-dimensional (row and column considered together) manner. The two-dimensional IDCT on an 8 by 8 block of values takes the form:

$$f(x, y) = \sum_{u=0}^{7} \sum_{v=0}^{7} F(u, v) C_u C_v \cos\left[\frac{(2x+1)u\pi}{16}\right] \cos\left[\frac{(2y+1)v\pi}{16}\right],$$

where f(x,y) is a resultant pixel value at position (x,y), F(u,v) is a recovered value at position (u,v) in the 8 by 8 block, and $C_u$ and $C_v$ are constants with different values when u or v are zero and non-zero. As evident from the formulation, the IDCT involves a large number of multiply and add operations.

The typical manner of performing a two-dimensional IDCT is to first perform a scalar (one-dimensional) IDCT on rows and then performing a second one-dimensional IDCT on columns of the block resulting from one-dimensional row IDCT. Even with a one-dimensional IDCT, assuming that all the cosine terms and constants are pre-computed together, calculating each resultant value potentially involves at least eight multiplies and seven adds. Most improvements to implementing the IDCT within a given computing platform are directed toward the speed of the platform in performing adds in comparison with multiplies since platforms vary with regard to this. Further, many improvements to the IDCT depending upon the precision (integer, floating point etc.) to be used for the terms, intermediate results and the final values.

While most of the most improvements to implementing the IDCT concentrate on platform-specific efficiencies and inefficiencies, other proposed improvements to implementing the IDCT take advantage of the nature of the inverse quantized values. The values recovered from inverse quantization (upon which the IDCT is to be performed) exhibit a large number of zero values. Some improvements focus therefore upon performing multiplies and adds only when necessary. Such implementations often involve compare instructions (determining if a value is non-zero or zero) and branch instructions that redirect program flow (when certain multiplys or adds can be avoided for instance). Each and every of the eight values that are to be fed into the one-dimensional IDCT can be tested for zero and then an appropriate case can be selected depending upon the test. The branching performed is multiple in nature. This scheme is unsatisfactory because there are too many cases that may occur and since branching itself could become an expensive operation to perform in most modern computing architectures. For instance, MMX and other architectures that use SIMD (Single Instruction, Multiple Data) instruction sets do not perform multiple branching efficiently at all.

There is thus a need for an enhanced IDCT method and apparatus that takes advantage of the number of zeroes in the input blocks.

SUMMARY OF THE INVENTION

What is disclosed is a method of implementing a two-dimensional Inverse Discrete Cosine Transform on a block of input data. The method includes 1) generating a performance array for the columns of the input data; 2) performing a column-wise IDCT upon the input data, the IDCT performed in accordance with cases given for each of the columns by the performance array; (3) generating a row performance offset for rows of the input data; and 4) performing a row-wise IDCT upon the result data from the performing of the column-wise IDCT.

In various embodiments, the performance array for columns and the row performance offset are concurrently generated prior to any IDCT being performed.

BRIEF DESCRIPTION OF THE DRAWINGS

FIG. 5 is an example of data to be subjected to a IDCT, and a corresponding performance array.

FIG. 6 is an example of column-wise IDCT result data to be subjected to a row-wise IDCT, and a row performance offset.

DETAILED DESCRIPTION OF THE INVENTION

The disclosure of United States Patent Application entitled "Method And Apparatus For Inverse Discrete Cosine Transform," having Ser. No. 09/756,970 filed on Jan. 9, 2001, is expressly incorporated herein by reference.

The invention in various embodiments implements a two-dimensional inverse discrete transform (IDCT) by enhancing a one dimensional column-wise IDCT and then enhancing a one-dimensional row-wise IDCT performed upon the result of the column-wise IDCT. The enhancement of the column-wise IDCT includes traversing through each column and finding the index (offset) of the last entry in each column containing a non-zero value. The offset for each column is used to perform one of a number of specialized IDCTs which has a substantially reduced number of adds and multiplys compared to conventional techniques. The number of possible branch instructions is also greatly reduced. After the column-wise IDCT is performed, then an enhanced row-wise IDCT is performed upon the result. The enhancement to the row-wise IDCT includes determining the index of the last entry of each row containing a non-zero value. In one embodiment, a single maximum index for all the rows is repeatedly used to perform a specialized IDCT for each row.

The below description refers to implementing of a single block IDCT. One skilled in the art will recognize that the methods described herein should be repeated over all the blocks of data comprising an image or other document. Furthermore, while the invention refers specifically to the IDCT, it can be adopted to perform any transform that operates on a row and column basis and which is likely to contain a great number of zeroes.

Figure 1:
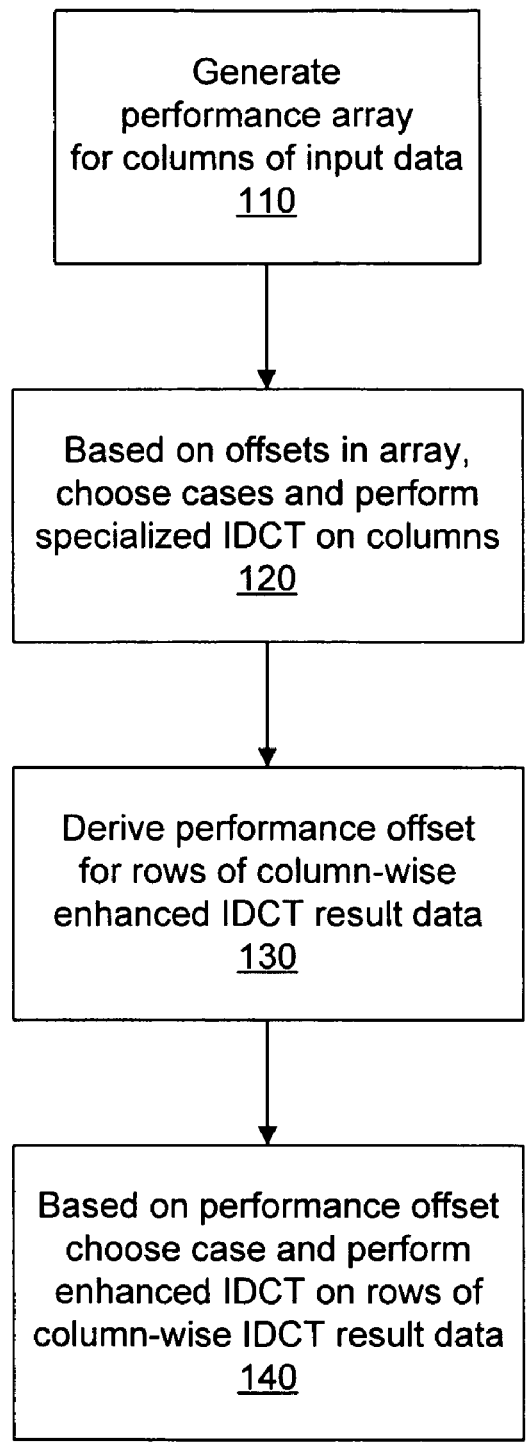
FIG. 1 illustrates the basic methodology of performing a two-dimensional inverse discrete cosine transform according to at least one embodiment of the invention.

FIG. 1 illustrates the basic methodology of performing a two-dimensional inverse discrete cosine transform according to at least one embodiment of the invention. Methodology 100 splits the two-dimensional IDCT into a sequence of two one-dimensional IDCTs. First, according to block 110, a 'performance array' is generated for the columns of input data to be transformed. The performance array consists of one-dimensional array of N elements, where N equals the total number of columns in the data to be transformed. The performance array, after being generated, would contain the index (row number) where the last non-zero value in each corresponding column of input data is found. These offsets indicate how far down a given column the IDCT needs to be performed. To implement this, a case-type branching can be used with a specialized IDCT being performed based on the value in the performance array for a given column. Thus, according to block 120, based on the values in the performance array, these cases can be chosen and a specialized IDCT (see below for further description of these specialized IDCTs) for all the columns can be performed. Each specialized IDCT avoids multiplying and adding operations for the zeroes that follow the non-zero element located at the index stored in the performance array for that column.

The result data from the column-wise IDCTs is a two-dimensional block of values the same size as the original input data. A row-wise IDCT performed upon this result data would yield a fully transformed block of data. The invention enhances the row-wise IDCT by generating a maximum performance offset for all rows of the result data (block 130). The maximum offset is discovered by traversing through a row of the column-wise result data and finding the index (column number) where the last non-zero value in the row of input data is found. This process is repeated for each row, and the maximum of all indices for all rows, is used as the "performance offset" for rows. This single value is then used to perform the same specialized IDCT for each and every row. A single row performance offset would be the maximum for all rows, and thus, some extra multiplies and adds (of zeroes) may be performed.

If it is desired to avoid these as well, a second performance array can be generated for the rows such that each row has its own performance offset. Then, a specialized IDCT can be performed based on the last non-zero element's position in each row. In alternate embodiments, dues to the nature of the IDCT, rows may be processed first instead of columns, and a performance array for rows generated. In such an embodiment, a single column performance offset for all columns can also be generated. A row-wise IDCT would be followed by a column-based IDCT on the row-wise result in such an embodiment. In still other embodiments, such as the one detailed in FIG. 7 below, the single row (or column, as the case may be) performance offset and the performance array for columns (or rows) can be generated in concurrency when the data upon which the IDCT is to be performed is being decoded (decompressed) rather than after decode.

Figure 2:
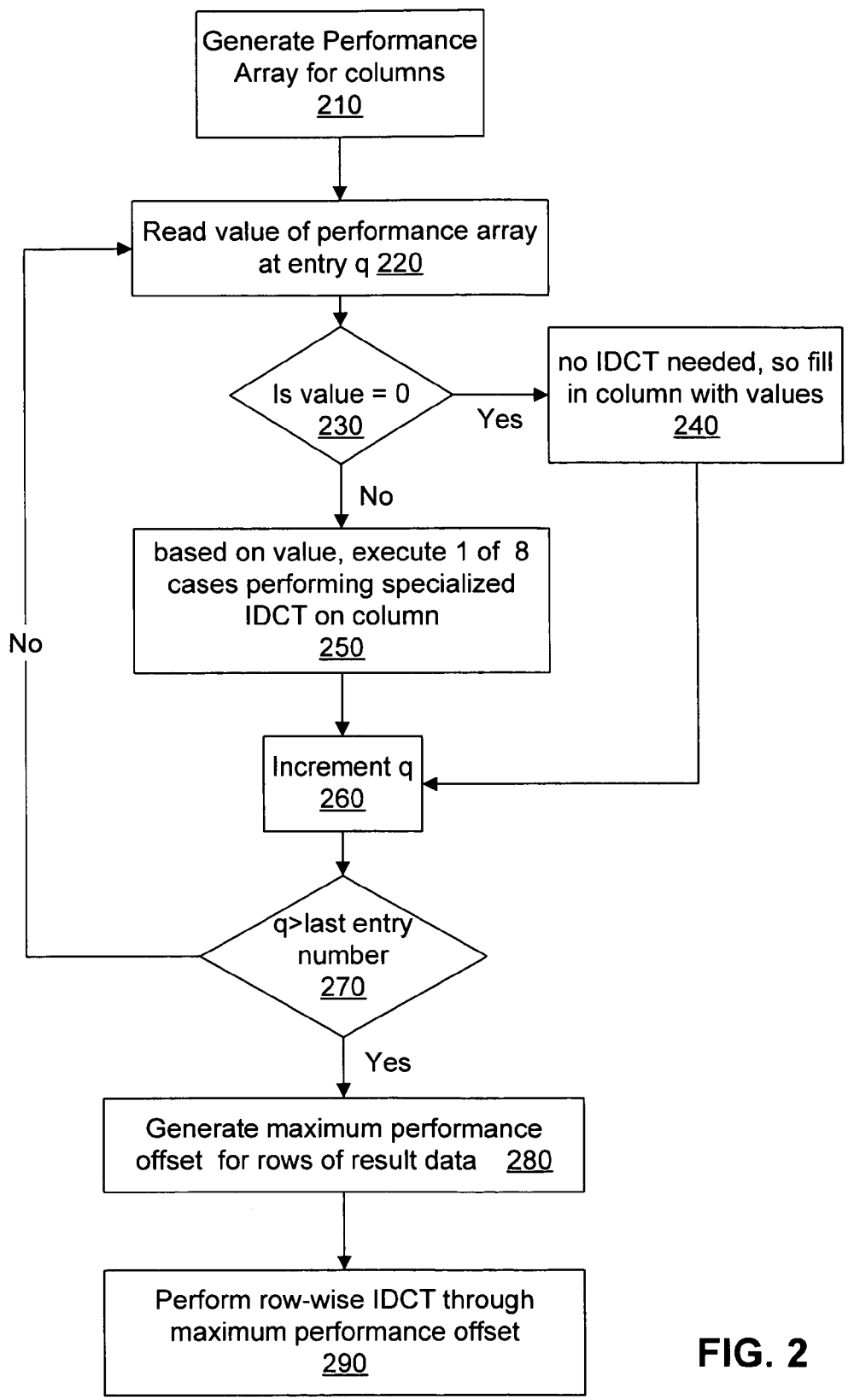
FIG. 2 illustrates details of performing of a two-dimensional IDCT using performance arrays and performance offsets according to at least one embodiment of the invention.

FIG. 2 illustrates details of performing of a two-dimensional IDCT using performance arrays and performance offsets according to at least one embodiment of the invention. According to block 210, a performance array for columns is first generated. The performance array is a one-dimensional array of an offset for each column of input data. Thus, if the input data block contains eight columns, the performance array would have eight entries, one for each column (see FIG. 5). Once the performance array is generated each "value" at a given entry index "q" is read from the array (block 220). Each value at an entry index q indicates an offset from the top of the corresponding column q at which the last non-zero data value lies.

If the value of the offset read from the performance array at entry q equals zero (checked at block 230), then no IDCT is needed. If all the values of a given column are zero, the performance array value for that column would be recorded as zero. Instead of performing multiply operations on zero values, the column is simply filled in with the appropriate value (such as zero) (block 240). After filling in the column with the default values, q is incremented to the next entry index in the performance array (block 260).

If the value is not zero (checked at block 230), then based on the value at the performance array, one of eight cases performing a specialized IDCT is executed for the column corresponding to the entry index q that produced the value (block 250). The specialized IDCTs are eight in number, in the embodiment shown in FIG. 2, since this embodiment assumes that the block of input data contains a total of eight columns. The case where the offset points to only one non-zero data element in a given column (the first one in the column) would merely copy that non-zero data element down the entire column if the IDCT were performed. This so-called "DC" term in the IDCT input data would provide the only contribution to any of the resulting data elements in the same column. The other seven cases multiply and add together only as many data elements in the column as necessary (and where appropriate, perform only as many shift operations as might be needed according to the specific implementation. Examples of such specialized IDCTs are detailed below with respect to FIG. 5.

Figure 7:
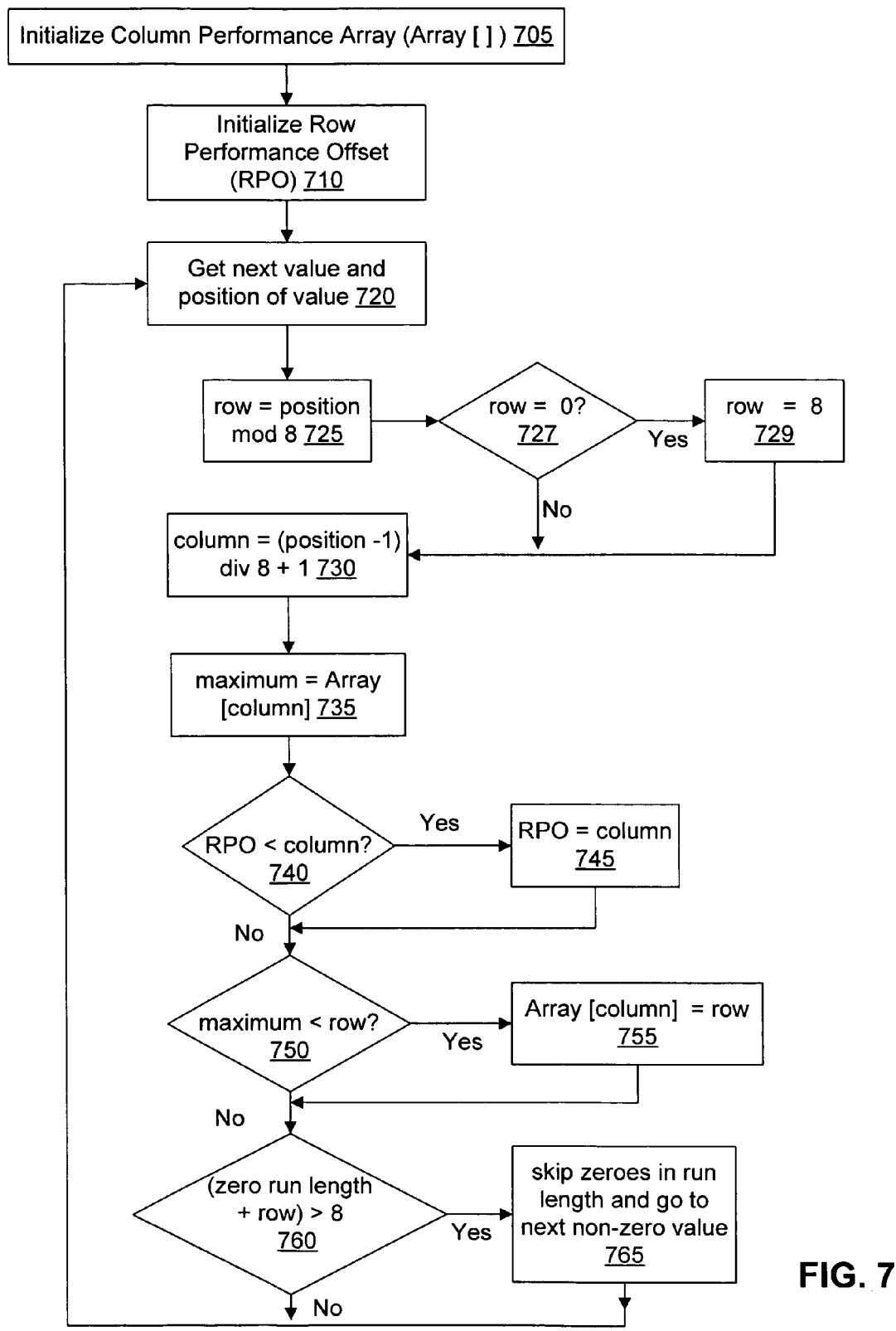
FIG. 7 illustrates simultaneous generation of performance array for columns and a row performance offset during decode of DCT data according at least one embodiment of the invention.

Next, the entry index q is incremented to point thereby to the entry in the performance array (block 260). Until the value of q becomes greater than the last entry index number, blocks 220 through 260 are repeated (checked at block 270). When the entire performance array has been traversed and the specialized column-wise IDCTs performed, the result data needs to be further transformed by a row-wise one dimensional IDCT. In one embodiment of the invention, this is achieved by generating a maximum performance offset for rows (also referred to as row performance offset) of the result data (block 280). While the embodiment of FIG. 2 shows this is to be a separate process, it can actually be combined with the process of generating the performance array for columns (for example, as shown in FIG. 7). The row performance offset is a single offset value that is applied to every row when the row-wise IDCT is performed, and is the maximum possible offset at which, in any row of the result data, a non-zero element could be found.

Accordingly, after the row performance offset is generated, the row-wise IDCT is performed on each row of the result through and including the data element at the index specified by the row performance offset (block 290). This IDCT may utilize the same code as that of the specialized IDCTs for columns, by transposition. However, only one of the eight specialized IDCTs would need to be chosen, and this specialized IDCT would repeated through each row. In other embodiments, a performance array for rows, similar to the performance array for columns, could also be generated, instead of forcing each row to be applied with the same specialized IDCT. Further, dues to the nature of the IDCT, any of the above processes can be transposably performed. For instance, a performance array for rows and the corresponding specialized IDCT for each row, could be performed first instead of columns. In such an embodiment, a single column performance offset can be generated for all columns (as was the case for rows in block 280 of FIG. 2).

Figure 3:
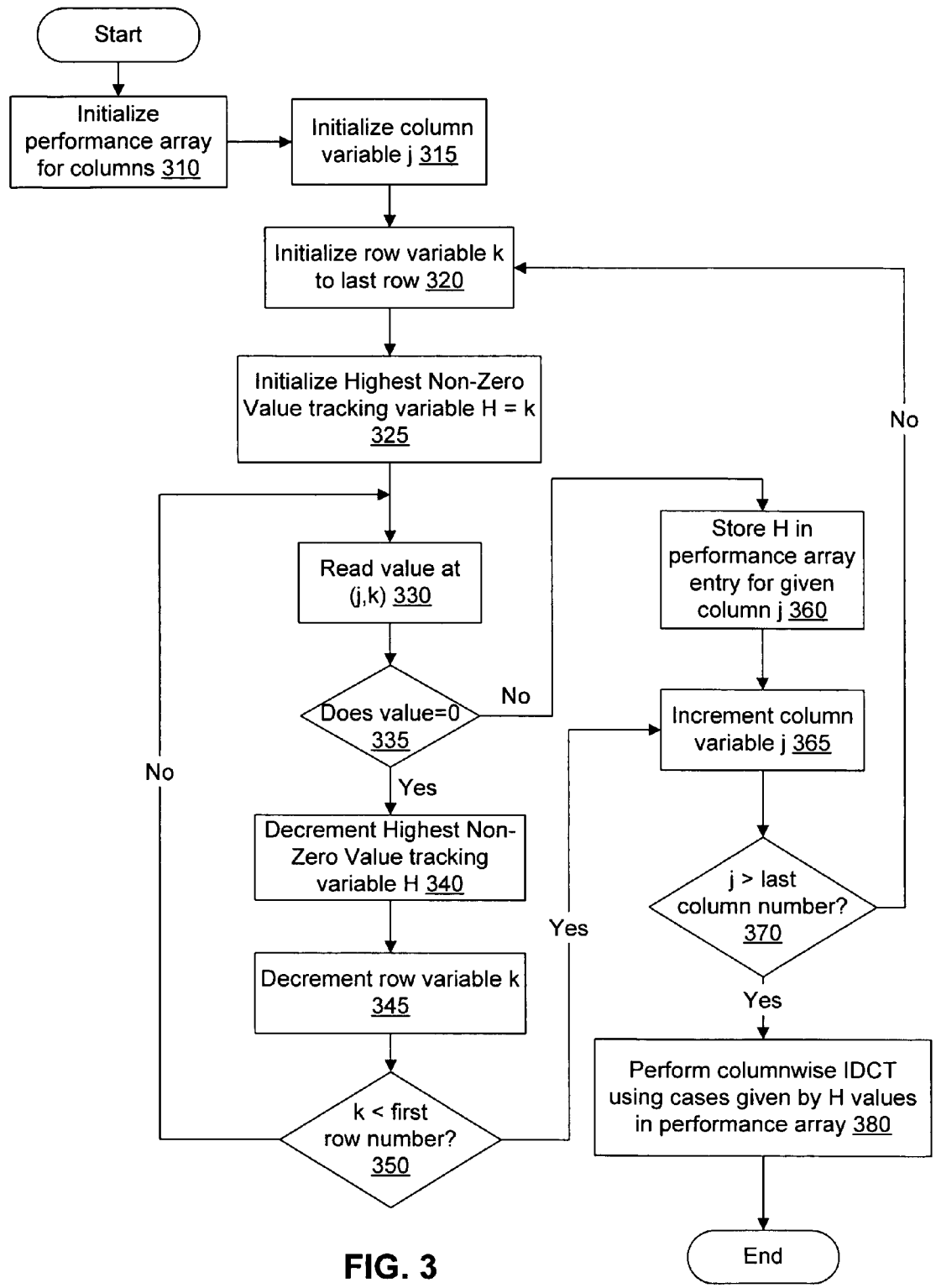
FIG. 3 illustrates generation of a performance array for columns according to at least one embodiment of the invention.

FIG. 3 illustrates generation of a performance array for columns according to at least one embodiment of the invention. According to block 310, the performance array for columns is initialized with all zero values. Then, a position tracking variable for the column number, "j", is initialized to the first column number (block 315). Also, a row position tracking variable "k" is initialized to the last row number (block 320) indicating a starting position at the end of a column (the last row of the column). In this embodiment, the performance array records the last entry of a given column that has a non-zero element. There may indeed be zero values interspersed in rows preceding the last non-zero element, but this is a small price to pay for avoiding the end of column string of zeroes.

To calculate the index entry of the highest non-zero element, a tracking variable H initialized to equal k, which is set at the last row number (block 325). As mentioned earlier, the process traverses through a given column in reverse, starting with the very last (for example, eighth) row of the column. The value of the input data at position (j,k) is then read out (block 330). The method essentially checks for zero elements that are read out and stops for given column j when a non-zero element is encountered. Hence, there is a comparison performed between each read out value and zero (block 335). If the value equals zero, then the tracking variable H is decremented (block 340). The row variable k is also decremented (block 345) to indicate a move to the previous row. If the variable k is less than the first row number (checked at 350), i.e., if the very first row has been reached and passed, then the current value of H, does not need to be stored in the performance array at entry j for the current column j (block 360). If the first row has been passed, then this indicates that all the elements in the column are zeroes, and thus, H should be at zero or some value indicating the total absence of non-zero values (i.e. no row offset). This value is already present in the performance array upon its initialization (block 310).

If the read out value does not equal zero, then a non-zero element has been encountered, and the current value of H is stored in the performance array at entry j for the current column j (block 360). If the variable k is not less than the first row number (checked at block 350), then the next value is read out at (j,k) which would now correspond to the value at the same column in the preceding row.

Once a value of H is stored in the performance array for a given column j (at block 360), then the next column should be traversed. To move to the next column, the column position tracking variable j is incremented (block 365). If j is greater than the last column number (checked at block 365), then the last row has been traversed. In that case, the performance array will be completed, and a column-wise IDCT using specialized column IDCTs will be performed based upon the H values in the performance array (block 380). If j is not greater than the last column number, then the row tracking variable k (checked at block 365) and the variable H are reinitialized (block 320 and block 325) and blocks 330 through 350 are repeated for the next column.

Figure 4:
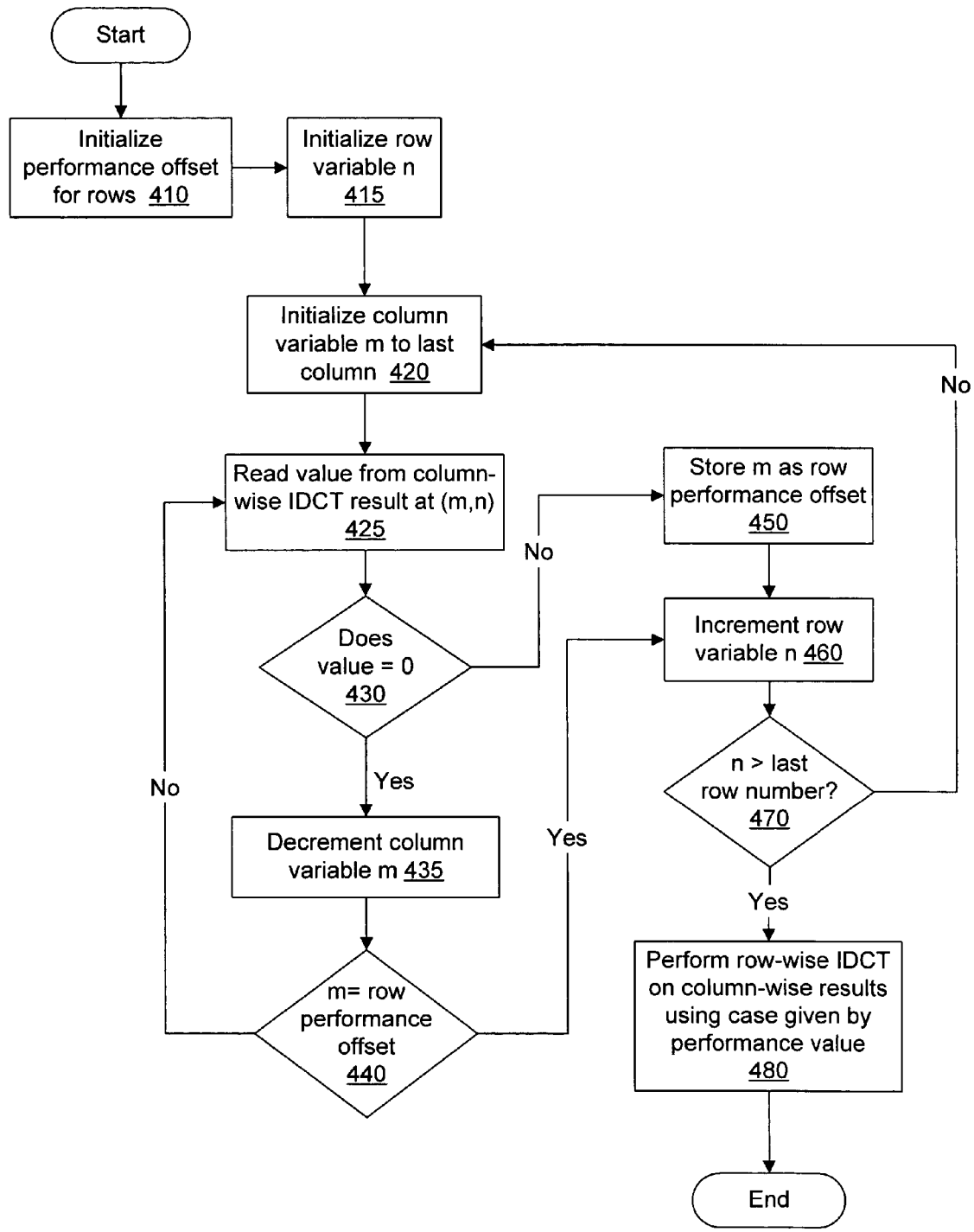
FIG. 4 illustrates generation of a performance offset for rows according to at least one embodiment of the invention.

FIG. 4 illustrates generation of a performance offset for rows according to at least one embodiment of the invention. The row performance offset is a single maximum offset that is shared by all the rows once generated. The row performance offset indicates the maximum of all the entry indices for the final non-zero elements of all the rows. Unlike the performance array for columns, the row performance offset is a single value rather than an array. In this embodiment, the row performance offset is generated by considering the result data from the column-wise IDCT already performed in accordance with performance array.

The row performance offset is first initialized (block 410), which in one embodiment entails setting it to eight (the last column number). Then a row position tracking variable n is initialized (block 415) to the first row, for instance. Also, a column tracking variable m is initialized to the last column (such as eight) (block 420). Since the rows are being traversed starting from the end of each row, going backward, the starting column position for each row is the last possible column.

A result value from the column-wise IDCT at a position (m,n) is read out (block 425). Each result value is compared to zero (block 430). If the result value from the IDCT at (m,n) equals zero, then the column variable m is decremented (block 435). If the result value from the IDCT at (m,n) is not equal to zero, then the row performance offset is stored as the current column position m (block 450). The traversing of the current row terminates and according to block 460, the row variable is incremented to the next row.

Whenever the column variable m reaches (is equal to) the current row performance offset (checked at block 440), the traversing of the current row terminates. In other words, there is no need to traverse to any position preceding the current value of the row performance offset since only the maximum for all rows is to be finally stored. In this case, thus, the row variable n is automatically incremented (block 460) to the next row.

If the current row number n is greater than the last row number (for instance, eight), then the end of all rows have been reached (checked at 470). At that point, the row performance offset is considered finalized and a row-wise IDCT can be performed on the column-wise IDCT result data using the case of specialized IDCT indicated by the row performance offset (block 480). If the n is not greater than the last row, then rows remain to be traversed (checked at block 470), and the column variable n is again initialized (block 420). Blocks 425 through 460 are once again repeated starting from the end of the next row and traversing backward.

As stated earlier, the row performance offset could be generated along with the performance array for columns during the decode of compressed DCT data. This embodiment, as well as others are detailed below. An example illustrating the technique of FIG. 4 is provided in FIG. 6.

FIG. 5 is an example of data to be subjected to a IDCT, and a corresponding performance array. An array of recovered values 500 represents the results of a decode/decompress of compressed DCT (Discrete Cosine Transform) data. The recovered data array 500 is typical of the block size of data on which the DCT and thus the IDCT would be performed. Array 500 consists of eight rows by eight columns of data values (elements). For purposes of illustration, the non-zero elements of the array are represented by variables rxy, where x represents the column number and y represents the column number. The entry r21 is therefore the recovered value from the second column and first row of the data. The elements of array 500 that are zero are so marked.

The invention operates as follows. First, a performance array 510 with an entry for each column, is initialized to zero. Starting at the first column, column one, and at the end of the column at row position equal to 8, the value at (1,8) is read out. Since the value at (1,8) is zero, the tracking variable H is decremented from an initial value of eight, giving an H value of seven. The row variable is also decremented while leaving the column variable unchanged, and thus, the value at (1,7) is next read. Since the value at (1,7) is non-zero (r17), the column is considered completed, and the current value of H=7 is immediately stored in the performance array 510 at entry 1 (for column 1). The process then restarts for the next column, column 2. The row variable and tracking variable H are both reinitialized to eight, and the value at the end of column 2, at (2,8) is read out. The value (at (2,8) equals zero and so both the row variable and the tracking variable H are decremented to seven (7). The value at (2,7) is next read out and since it equals zero, the row variable and tracking variable H are decremented again, to a value of six (6). The value at (2,6) is r26 which is non-zero. Therefore, at this point, the value of H (currently 6) is written out and stored to the performance array 510 at entry 2, for column 2.

This process repeats for all the columns and where there are no non-zero values, such as in columns 6, 7 and 8, no new H value in stored in the performance array 510, and rather, the performance array 510 maintains its initialization value of zero. Once the performance array 510 is completed for all the columns, the specialized IDCTs can be performed for each column. The conventional one-dimensional column IDCT for transforming an element F(u,v) at a given position (u,v) to a value f(x,y) is:

$$f(x, y) = \sum_{v=1}^{8} F(u, v) C_v \cos\left[\frac{(2y+1)(v-1)\pi}{16}\right],$$

where $C_v$ is a multiplier with two different values, one when v is one and another when v is not one. According to the invention, with the performance array generated, a specialized IDCT can be performed for each row. For instance, the performance array value for column 2 is 6. Then the specialized IDCT for the column would look like, for each position (2,y) in the column:

$$f(2, y) = \sum_{v=1}^{6} F(2, v) C_v \cos\left[\frac{(2y+1)(v-1)\pi}{16}\right],$$

where $C_v$ is a multiplier with two different values, one when v is one and another when v is not one. Implementing this specialized IDCT reduces the number of multiplys, adds, shifts and other operations that would typically be necessary for the last two elements at (2,7) and (2,8) of the column. For columns 6, 7 and 8 no IDCT needs to be performed, which is reflected in the performance array values of zero. Similar specialized IDCTs, one for each of eight non-zero performance array value cases are pre-coded, and executed as appropriate. Thus, only a single compare and branch is performed for every column. Also, the number of arithmetic operations is reduced in each column. There is a tradeoff between having to generate a performance array and the savings in arithmetic operations. Given the great number of zeroes usually contained in the DCT data, the tradeoff usually gives a speed advantage.

FIG. 6 is an example of column-wise IDCT result data to be subjected to a row-wise IDCT, and a row performance offset. The column-wise IDCT result data 600 is also the same eight by eight size as the recovered array 500 but may have different zero and non-zero values (elements). The row performance offset 610 is a single value that is a maximum of all the offsets for all the rows.

For purposes of illustration, the non-zero elements of the result data 600 are represented by variables cxy, where x represents the column number and y represents the column number. The entry c21 is therefore the recovered value from the second column and first row of the result data. The elements of result data 600 that are zero are so marked.

The invention operates as follows. First, the row performance offset 610 is initialized to eight. Starting at the first row, row one, and at the last column at position equal to 8, the value at (8,1) is read out. Since the value at (8,1) is zero, the column variable is decremented, and next, the value at (7,1) is next read. Since the value at (7,1) is also zero, the column variable is again decremented to 6, and next, the value at (6,1) is read. Since the value at (6,1) is also zero, the column variable is again decremented to 5, and next, the value at (5,1) is read. The value at (5,1) is the non-zero value c51, and thus, according to the flow shown in FIG. 4, the current column number m is immediately stored as the row performance offset 610. The row is then considered traversed, and the current column number of 5 is stored as the row performance offset 610.

The process then restarts for the next row, row 2. The column variable is reinitialized to eight, and the value at the end of row 2, at (8,2) is read out. The value (at (8,2) equals zero and so the column variable decremented to seven (7).

The value at (7,2) is next read out and since it equals zero, the column variable is again decremented to 6, and next, the value at (6,2) is read. Since the value at (6,1) is also zero, the column variable is again decremented to 5. Since the row performance offset is to be the maximum for all rows, any possible offsets below the currently stored row performance offset is irrelevant. For instance, in row 2 of result data 600 the last non-zero element is actually at column number 4, which is less than 5. However, since only one offset is being used for all rows, in this embodiment, the maximum must be used to ensure that all non-zero elements are accounted for in the IDCT. Thus, whenever the column variable equals the row performance offset currently stored, the row traversal can terminate and the next row can be processed. The value of 5 in the row performance offset 610 would change if and only if latter rows contained a non-zero value in columns 6, 7 or 8.

This process repeats for all the rows. Once the row performance offset 610 is determined for all the row, the same specialized IDCT can be performed for each row. The conventional one-dimensional row IDCT for transforming an element F(u,v) at a given position (u,v) to a value f(x,y) is:

$$f(x, y) = \sum_{u=1}^{8} F(u, v) C_u \cos\left[\frac{(2x+1)(u-1)\pi}{16}\right],$$

where $C_u$ is a multiplier with two different values, one when u is one and another when u is not one. According to the invention, with the row performance offset generated, the same specialized IDCT can be performed for each row. For instance, the row performance offset 610 has a value of five (5). Then the specialized IDCT for each row v would look like, for each position (x,y) in the final result:

$$f(x, y) = \sum_{u=1}^{5} F(u, v) C_u \cos\left[\frac{(2x+1)(u-1)\pi}{16}\right],$$

where $C_u$ is a multiplier with two different values, one when u is one and another when u is not one. Implementing this specialized IDCT reduces the number of multiplys, adds, shifts and other operations necessary on the last three elements of every row. For columns 6, 7 and 8 no IDCT arithmetic needs to be performed. Further, only a single compare and branch is performed for all the rows (one case of eight selected).

FIG. 7 illustrates simultaneous generation of performance array for columns and a row performance offset during decode of DCT data according at least one embodiment of the invention. This embodiment assumes that the DCT data, which is in a compressed form using Huffman and/or Zero Run Length encoding has yet to be decoded. The embodiments of FIGS. 1-4 are after such a decode has taken place and raw values are recovered (such as the recovered value array 500 of FIG. 5). During decode itself however, certain information can be extracted that can show exactly what values should be used for the performance array for columns and the row performance offset. This may be more efficient, depending upon the encoding used and whether the decode algorithm is subjectable to modification.

Usually, given the high number of zeroes in the DCT data, when packed and encoded in a compressed form, one piece of information commonly found is "zero run-length" information. One form of encoding using zero run would use a symbol set or encoding for all non-zero values and a marker for the start of any number of zeroes. Instead of storing the zero values or a symbol for each zero value, as the case may be, the number of zeroes, i.e. the length of the run of zeroes is stored instead. Since the invention entails essentially tests for zero and non-zero values, the clues provided by the zero run-length information could be used effectively to arrive at both the performance array and the row performance offset. Further, position information about where each value belongs (row and column) is also embedded within or can be derived from the encoded DCT data, and this too, can be utilized efficiently. The position information is assumed to be single number not a pair of row and column values, but rather a linear combination of both. In the below diagram, it is assumed that the position values range from 1 through 64 for the eight by eight block of values. A position of 1 is in the first row, first column, while a position of 2 is in the second row, first column and so on.

As in other embodiments, the column performance array (labeled Array[z], where z is the entry index) is initialized (block 705). Also, the row performance offset (hereinafter labeled "RPO") is initialized to its starting value (block 710). If the column and row number start at 1, as in FIGS. 5 and 6, then the RPO and the array[ ] is initialized to values of one, for example. The process begins by retrieving an element value and position of the value for the first data element (block 720). The exact details of how these are retrieved depends upon the encoding of the DCT data and is beyond the scope of this description. However, another counting variable (not shown) could be used to "track" the sequential position shift as each value is decoded, with provision for advancing the position when zero run-lengths are encountered.

The position of the value yields both the row and column information. The row is equal to the position mod 8, where mod indicates a modulo function (block 725). The modulo function gives the remainder of integer division. For instance, 1 mod 8 and 9 mod 8 both give a result of 1, indicating that the row is equal to one. In the case where the position value is a whole multiple of eight, the remainder would be zero. Thus, according to block 727, we test if the row=position mod 8 yields a zero value. If so, then the row value is set to 8 rather than zero (block 729). An alternate formulation that avoids the compare-branch of blocks 727 and 729 is to compute the row as row=(position−1) mod 8+1.

In either case, the column value can be computed by taking the position and performing an integer division ("div") function upon it. Accordingly, the column is equal to the (position−1) div 8 incremented by one (block 730). For example (1−1) div 8 equals to zero, and then adding one, gives the column number of 1. Since the column numbers used in the above examples range from 1 to 8, an addition of 1 to the div result is necessary to yield a column of one, where the integer division gives zero and a column of two where the division gives one and so on.

Once the row and column position is computed, the RPO and the values of Array[ ] can be processed. Because of the nature of the IDCT, the current maximum ("maximum") can be set equal to the value of the Array[column] (block 735). If the RPO is less than the column position (checked at block 740), then the RPO is set equal the column position (block 745). In either case, the next comparison is to see if the current maximum is less than the current row position (block 750). If so, the value of the performance array Array[column] is set equal to the current row number (block 755). This emulates the finding of the maximum row for a given column until a non-zero element is encountered.

According to this embodiment the last zero run-lengths of any column or row need to be found. Thus, if a zero run length value (which defaults at zero, meaning there are no zeroes) added to the current row position is greater than or equal to 8, then the zero run length would advance the row all the way to the last row number (checked at block 760). This indicates that an end of column zero run length has been discovered. Any other zero runs interspersed betwixt non-zero elements would be ignored. When the zero run length and row is greater than eight, the zeroes are skipped and the next non-zero value is advanced to (block 765). Since the row and column do not need to be tracked separately and is found by the position, only the RPO and the value needs to be computed in each pass. As with other embodiments, one can find a performance array for rows and a single column performance offset by transposing the algorithm.

Figure 8:
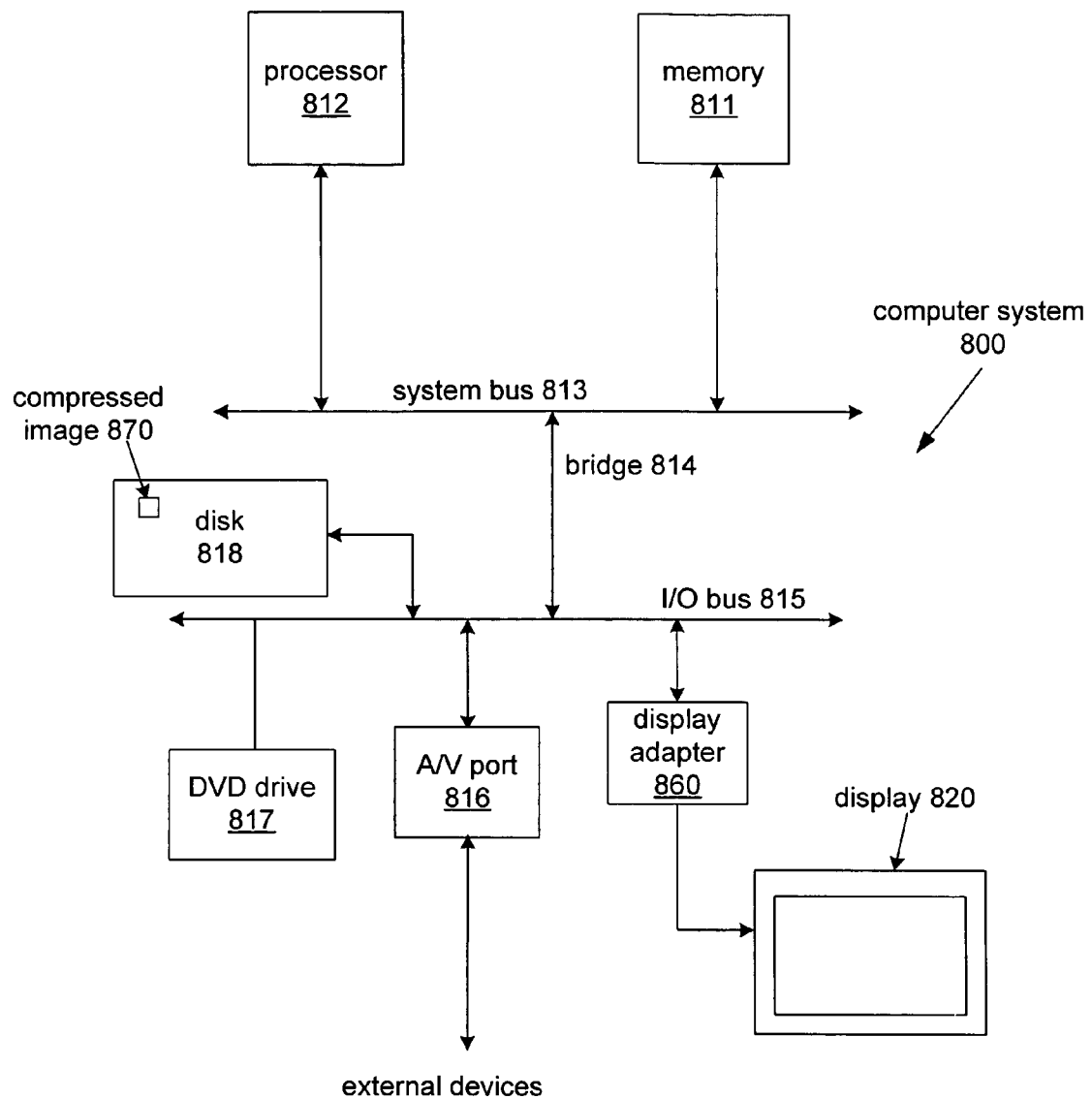
FIG. 8 shows an exemplary computer system capable of implementing various embodiments of the invention.

FIG. 8 shows an exemplary computer system capable of implementing various embodiments of the invention. A computer system 800 may be any of a mobile computer, desktop computer or any general or special purpose information processing device. System 800 features a system bus 813 for allowing core internal components, such as a processor 812 and a memory 811, to communicate with each other. Memory 811 may consist of random access memory (RAM), in any of its varieties or any other temporary or volatile storage mechanism. Memory 811 operates to store instructions to be executed by processor 812. Memory 811 also may be used for storing temporary variables or other intermediate result data during execution of instructions by processor 812.

Computer system 800 also has a bridge 814 which couples to an I/O (Input/Output) bus 815. I/O bus 815 connects to system 800 various peripheral and I/O devices such as a Audio/Video (A/V) port 816, a disk 818 and a DVD (Digital Video Disk) drive 817. I/O bus 815 also couples to the system a display adapter 860 which is responsible for image processing/rendering functions for computer system 800.

Display adapter 860 may include still image processing/rendering and motion image/video (such as MPEG) processing/rendering capability. Display adapter 860 renders its still/motion image data to a display device 820 such as a monitor or LCD (Liquid Crystal Display) screen. Display adapter 860 typically has its own on-board video memory for image processing and rendering in order to speed up processing/rendering and to avoid utilizing memory 811 for such operations.

The A/V port 816 enables the system 800 to connect to external A/V devices and facilitates the exchange of audio and video information between system 800 and such external devices. For instance, a video feed or sequence of still images may be fed into system 800 by way of the A/V port 816. In certain instances, the A/V port 816 may have been built into another device/card such as the display adapter 860. The A/V port may provide for the connection of external devices using electro-mechanical connectors such as composite video or stereo audio cables. Disk 818 is a hard disk drive, floppy disk drive or tape drive or other form of non-volatile storage and is used to store data/application files and other more permanent information.

Client 800 has an operating system software (not depicted) that handles the interaction between its devices and software applications. Such software would carry information regarding video codecs (compression/decompression), file formats and what applications or devices may be associated with files. Operating system software also governs the manner/mechanism of input/output for users of client 800. Applications, such as a DVD player software, are usually built on top of and work in conjunction with the operating system software. Due to its criticality, operating system software is most often permanently stored on disk 818, firmware or other semi-permanent storage. The operating system software typically runs in memory 811 after being loaded upon the start-up of computer system 800. In accordance with the invention, DVD player and/or video codecs can be modified to include the enhanced IDCT implementation described in various embodiments above.

Input data such as video information would be stored onto disk 818 as a compressed image 870. The input data may originate as a frame of a source such as a DVD placed in DVD drive 817 or may originate as a single frame or difference frame of a feed from an external device connected through the A/V port 816. The compressed image 870, according to the invention, would be compressed using DCT or similar transform mechanisms.

Once stored, the compressed image 870 can be manipulated in a number of ways. Conventionally, the compressed image 870 is taken through a process that involves first decoding the data which may be encoded in Huffman or Zero Run-Length encoding or a combination of both. According to various embodiments of the invention, certain parameters to enhance the speed of the IDCT can be determined during this data decode stage. A performance array for columns and row performance offset (or performance array for rows and column performance offset) can be generated while the decode occurs. The decode state usually contains zero run-length and other information useful for finding where in a given block of the compressed frame data non-zero values lie. After decode, the data is inverse quantized and then, subjected to an IDCT. The IDCT is performed in blocks of usually eight columns by eight rows of values.

In other embodiments of the invention, the performance array for columns and row performance array is generated after inverse quantization, when the full data upon which the IDCT is to be performed. The performance array for columns (or rows) and row (or column) performance offset allows for the IDCT to be optimized. Specifically, the IDCT program code could implement a series of eight specialized IDCTs. Based upon the performance array offset value for a given column, the computer system 800 can be programmed to branch to the code for one of eight specialized IDCTs. These specialized IDCTs perform less arithmetic operations than a full IDCT since only part of a column is used in computing the transformed values. Once a column-wise IDCT is performed, the result data, which may be stored on disk 818 or in memory 811, is then subjected to an optimized row-wise IDCT. The row-wise IDCT is performed by considering a single row performance offset. The row performance offset is then used in choosing one of eight specialized IDCTs and applying these to the column-wise IDCT result data. Each row is operated upon by the same specialized IDCT, given by the row performance offset.

The enhanced IDCT described in various embodiments of the invention can be included as part of an multi-media player or other imaging software executing on processor 812 when loaded into memory 811. Such application programs or code to implement the computation of performance arrays and performance offsets, choosing of code sections for specialized IDCTs, the implementing of these specialized IDCTs, can be written by those of skill in the art in a source language such as C++ and may be compiled and stored as executable(s) on disk 818. As part of an application program or codec, such code may be pre-compiled and stored on a disc loaded by DVD-ROM 817 and then loaded into memory 811 or installed onto disk 818.

In still another embodiment of the invention, the memory 811 may have a particular data-width such that data can more effectively be processed in pairs. When performing an eight column by eight row two-dimensional IDCT, for example, in such memory architectures, the actual block of data is a virtual four rows by four columns. In such an instance, the performance array for columns would have only four elements. The offset in each entry of the performance array is the maximum of offsets for two columns. Thus, referring back to the example of FIG. 5, the performance array would have four entries. The first entry would be maximum of offsets for both columns 1 and 2, which is 7 (7 is greater than 6, so choose 7). Depending upon the characteristics of processor 812 and memory 811, many such alternate embodiments can be fashioned by those of ordinary skill in the art. Further, the enhanced IDCT may be performed by other special-purpose devices such as that of display adapter 860 whose on-board processor and memory may be utilized instead to carry an enhanced IDCT in accordance with various embodiments of the invention. Further, while the invention refers to performance of an enhanced IDCT upon image data, the various embodiments thereof are general in nature and function equally with respect any type of data. Where transforms other than the IDCT need to be performed, the invention can be adapted by one of ordinary skill in the art for any transform, forward or inverse. The invention works particularly well where the data set has a high number of zeroes, a statistically high chance for zeroes and any repeating values that do not contribute to the results of a particular transform.

What is claimed is:

1. A non-transitory computer readable medium storing a computer program which when executed by at least one processor of a computing device performs a two-dimensional inverse discrete cosine transform ("IDCT") to produce image data from a block of dequantized image data arranged in rows and columns, the computer program comprising sets of instructions for:

determining a row performance offset from the dequantized image data by identifying a highest column number in the rows of dequantized image data at which a last non-zero element is found and specifying the highest column number as the row performance offset;

performing a column-wise IDCT upon the dequantized image data to produce a column-wise IDCT result data; and performing a row-wise IDCT upon the column-wise IDCT result data by performing a set of arithmetic operations for each element on every row up to the highest column number specified by the row performance offset, said set of operations including one or more operations for any zero element.

2. The non-transitory computer readable medium of claim 1, wherein the computer program further comprises a set of instructions for generating a column performance array from the dequantized image data, wherein the column performance array stores a particular column offset for each column relating to a row number at which a last non-zero element in the column is found.

3. The non-transitory computer readable medium of claim 2, wherein the set of instructions for generating the column performance array from the dequantized image data comprises a set of instructions for:

for each particular column of the dequantized image data, (i) traversing each row from a last row to a first row in order to identify a row number of a last non-zero element and (ii) specifying the identified row number of the last non-zero element as the particular column offset for the particular column.

4. The non-transitory computer readable medium of claim 2, wherein the set of instructions for performing the column-wise IDCT comprises a set of instructions for performing a specialized IDCT on each column of the dequantized image data, the specialized IDCT implementing for each column an amount of arithmetic operations designated by the particular column offset stored in the column performance array, and wherein the set of instructions for performing the row-wise IDCT comprises a set of instructions for performing a specialized IDCT on each row of the column-wise IDCT result data, the specialized IDCT implementing the amount of arithmetic operations designated by the row performance offset.

5. A non-transitory computer readable medium storing a computer program which when executed by at least at least one processor of a computing device performs a two-dimensional inverse discrete cosine transform ("IDCT") to produce image data from a block of dequantized image data arranged in rows and columns, the computer program comprising sets of instructions for:

generating a column performance array from the dequantized image data, wherein said generating comprises identifying, for each particular column of the dequantized image data, a row number of a last non-zero element and specifying the identified row number as a column offset for the particular column;

determining a row performance offset from the dequantized image data by identifying a highest column number in the rows of dequantized image data at which a last non-zero element is found and specifying the highest column number as the row performance offset;

performing a column-wise IDCT upon the dequantized image data to produce a column-wise IDCT result data by performing, for each particular column of the dequantized image data, a first set of arithmetic operations for each element up to a particular row specified by the corresponding column offset, said first set of operations including one or more operations for any zero element prior to the particular row; and performing a row-wise IDCT upon the column-wise IDCT result data by performing a second set of arithmetic operations for each element on every row up to the highest column number specified by the row performance offset, said second set of operations including one or more operations for any zero element.

6. An apparatus configured to perform a two-dimensional inverse discrete cosine transform ("IDCT") to produce image data from a block of dequantized image data arranged in rows and columns, the apparatus comprising:

means for determining a column performance offset from the dequantized image data by identifying a highest row number in the columns of dequantized image data at which a last non-zero element is found and specifying the highest row number as the column performance offset;

means for performing a row-wise IDCT upon the dequantized image data to produce a row-wise IDCT result data; and means for performing a column-wise IDCT upon the row-wise IDCT result data by performing a set of arithmetic operations for each element on every column up to the highest row number specified by the column performance offset, said set of operations including one or more operations for any zero element.

7. The apparatus of claim 6 further comprising means for generating a row performance array from the dequantized image data, wherein the row performance array stores a particular row offset for each row relating to a column number at which a last non-zero element in the row is found.

8. The apparatus of claim 7, wherein the means for generating the row performance array from the dequantized image data comprises means for:
(i) traversing each column of each particular row from a last column to a first column in order to identify a column number of a last non-zero element and (ii) storing the identified column number of the last non-zero element as the particular row offset for the particular row.

9. The apparatus of claim 7, wherein the means for performing the row-wise IDCT comprises means for performing a specialized IDCT on each row of the dequantized image data, the specialized IDCT implementing for each row the amount of arithmetic operations designated by the particular row offset stored in the row performance array, and
wherein the means for performing the column-wise IDCT comprises means for performing a specialized IDCT on each column of the row-wise IDCT result data, the specialized IDCT implementing the amount of arithmetic operations designated by the column performance offset.

10. The apparatus of claim 6, wherein the means for determining the column performance offset comprises:
means for storing an initial number as the column performance offset; and
means for (i) traversing each particular column from a last row towards a first row until at least one of a non-zero element in a particular column is identified and a row number that is one higher than the stored column performance offset is reached, and (ii) when the non-zero element is identified, storing a corresponding row number of the identified non-zero element as the column performance offset.

11. A method for performing a two-dimensional inverse discrete cosine transform ("IDCT") on a computing device, said IDCT producing image data from a block of dequantized image data arranged in rows and columns, the method comprising:
at the computing device:
performing a column-wise IDCT upon the dequantized image data to produce column-wise IDCT result data;
after performing the column-wise IDCT, determining a row performance offset from the column-wise IDCT result data by identifying a highest column number in the rows of the column-wise IDCT result data at which a last non-zero element is found and specifying the highest column number as the row performance offset; and
performing a row-wise IDCT upon the column-wise IDCT result data to produce image data by performing a set of arithmetic operations for each element on every row up to the highest column number specified by the row performance offset, said set of operations including one or more operations for any zero element.

12. The method of claim 11 wherein generating the row performance offset comprises:
storing an initial number as the row performance offset, and
for each particular row of the column-wise IDCT result data, (i) traversing from a last column towards a first column until at least one of a non-zero element is identified and a column number that is one higher than the stored row performance offset is reached, and (ii) when the non-zero element is identified, storing a corresponding column number of the identified non-zero element as the row performance offset.

13. The method of claim 11 further comprising:
generating a column performance array comprising a column offset for each column of the dequantized image data, the column offset relating to a particular row at which a last non-zero element in the column is found,
wherein performing the column-wise IDCT comprises performing, for each particular column of the dequantized image data, a set of arithmetic operations for each element up to the particular row specified by the corresponding column offset, said first set of operations including one or more operations for any zero element prior to the particular row.

14. The method of claim 13, wherein the dequantized image data comprises unmodified data recovered from an inverse quantization process.

15. A method for performing a two-dimensional inverse discrete cosine transform ("IDCT") on a computing device to produce image data from a block of dequantized image data arranged in rows and columns, the method comprising:
at the computing device:
performing a row-wise IDCT upon the dequantized image data to produce row-wise IDCT result data;
after performing the row-wise IDCT, generating a column performance offset from the row-wise IDCT result data, said column performance offset indicating a number of arithmetic operations to be performed on columns of the row-wise IDCT result data, the generating comprising:
for each column of the row-wise IDCT result data, identifying a row number at which a last non-zero element is found, and
comparing the identified row numbers in order to store a highest row number as the column performance offset; and
performing a column-wise IDCT upon the row-wise IDCT result data to produce image data, the column-wise IDCT implementing, for each row, the number of arithmetic operations that is indicated by the column performance offset.

16. The method of claim 15, wherein generating the column performance offset further comprises:
storing the column performance offset having an initialized value;
traversing through a given column of the row-wise IDCT result data starting from a last row to a first row until a last non-zero element is found;
comparing a row number of the last non-zero element of the given column with the stored column performance offset;
when the row number is greater than the stored column performance offset, replacing the stored column performance offset with the row number; and
repeating the traversing, comparing, and storing for each column of the row-wise IDCT result data.

17. The method of claim 15 further comprising:
generating a row performance array comprising a row offset for each row of the dequantized image data, the row offset relating to a last column at which a non-zero element in the row is found,
wherein performing the row-wise IDCT comprises performing the row-wise IDCT in accordance with the row performance array.

18. The method of claim 17 wherein the dequantized image data comprises unmodified data recovered from an inverse quantization process.

19. The method of claim 15, wherein the comparing comprises for each identified row number comparing the identified row number to an offset value stored for the column performance offset, and storing the identified row number as the offset value when the identified row number is greater than the stored offset value.

20. A non-transitory computer readable medium storing a computer program which when executed by at least one processor of a computing device performs a two-dimensional inverse discrete cosine transform ("IDCT") to produce image data from a block of dequantized image data arranged in rows and columns, the computer program comprising sets of instructions for:
performing a column-wise IDCT upon the dequantized image data to produce column-wise IDCT result data;
generating a row performance offset from the column-wise IDCT result data after performing the column-wise IDCT, said row performance offset indicating a number of arithmetic operations to be performed on rows of the column-wise IDCT result data, the set of instructions for generating comprising sets of instructions for:
identifying, for each row of the column-wise IDCT result data, a column number at which a last non-zero element is found, and
comparing the identified column numbers in order to store a highest column number as the row performance offset; and
performing a row-wise IDCT upon the column-wise IDCT result data, the row-wise IDCT implementing, for each row, the number of arithmetic operations that is indicated by the row performance offset.

21. The non-transitory computer readable medium of claim 20 wherein the set of instructions for generating the row performance offset further comprises sets of instructions for:
storing the row performance offset having an initialized value;
traversing through a given row of the column-wise IDCT result data starting from a last column to a first column until a last non-zero element is found;
comparing a column number of the last non-zero element of the given row with the stored row performance offset;
when the column number is greater than the stored row performance offset, replacing the stored row performance offset with the column number; and
repeating the traversing, comparing, and storing for each row of the column-wise IDCT result data.

22. The non-transitory computer readable medium of claim 20 further comprising a set of instructions for:
generating a column performance array comprising a column offset for each column of the dequantized image data, the column offset relating to a last row at which a non-zero element in the column is found,
wherein the set of instructions for performing the column-wise IDCT comprises a set of instructions for performing the column-wise IDCT in accordance with the column performance array.

23. The method of claim 20, wherein the comparing comprises for each identified column number comparing the identified column number to an offset value stored for the row performance offset, and storing the identified column number as the offset value when the identified column number is greater than the stored offset value.

24. An apparatus configured to perform a two-dimensional inverse discrete cosine transform ("IDCT") to produce image data from a block of dequantized image data arranged in rows and columns, the apparatus comprising:
means for performing a column-wise IDCT upon the dequantized image data to produce column-wise IDCT result data;
means for generating a row performance offset from the column-wise IDCT result data after performing the column-wise IDCT, said row performance offset indicating a number of arithmetic operations to be performed on rows of the column-wise IDCT result data, the means for generating comprising:
means for identifying a column number at which a last non-zero element is found for each row of the column-wise IDCT result data, and
means for comparing the identified column numbers in order to store a highest column number as the row performance offset; and
means for performing a row-wise IDCT upon the column-wise IDCT result data, the row-wise IDCT implementing, for each row, the number of arithmetic operations that is indicated by the row performance offset.

25. The apparatus of claim 24, wherein the means for generating the row performance offset further comprises:
means for storing the row performance offset having an initialized value;
means for traversing through a given row of the column-wise IDCT result data starting from a last column to a first column until a last non-zero element is found;
means for comparing a column number of the last non-zero element of the given row with the stored row performance offset;
means for replacing the stored row performance offset with the column number when the column number is greater than the stored row performance offset; and
means for repeating the traversing, comparing, and storing for each row of the column-wise IDCT result data.

26. The apparatus of claim 24 further comprising:
means for generating a column performance array comprising a column offset for each column of the dequantized image data, the column offset relating to a last row at which a non-zero element in the column is found,
wherein the means for performing the column-wise IDCT comprises means for performing the column-wise IDCT in accordance with the column performance array.

27. A method for performing a two-dimensional inverse discrete cosine transform ("IDCT") on a computing device, said IDCT producing image data from a block of dequantized image data arranged in rows and columns, said method comprising:
at the computing device:
receiving the dequantized image data produced as a result of an inverse quantization process;
from the dequantized image data, generating a column performance array for the dequantized image data, wherein said generating comprises, for each particular column of the dequantized image data, identifying a row number at which a last non-zero element is found and storing the identified row number for the particular column in the column performance array;
performing a column-wise IDCT directly upon the dequantized image data to produce column-wise IDCT result data by performing, for each particular column of the dequantized image data, a set of arithmetic operations for each element in the particular column of the dequantized image data up to a particular row specified by the corresponding row number stored for the particular column in the column performance array, said set of operations including one or more operations for any zero element prior to the particular row; and performing a row-wise IDCT upon the column-wise IDCT result data to produce image data.

28. The method of claim 27, wherein the set of arithmetic operations includes at least one of multiplication, addition, and shift operations.

29. The method of claim 27, wherein the generating the column performance array comprises:

for each particular column of the dequantized image data, traversing each row from a last row to a first row in order to identify the row number of the last non-zero element.

30. The method of claim 27 further comprising generating a row performance offset by identifying, from the column wise IDCT result data, a highest column number in the rows of the column-wise IDCT result data at which a non-zero element is found and storing the highest column number as the row performance offset, wherein performing the row-wise IDCT comprises performing a set of arithmetic operations for each element on every row in the column-wise IDCT result data up to the highest column number stored as the row performance offset, said set of operations including one or more arithmetic operations for any zero element.

31. The method of claim 27 further comprising generating a row performance offset by identifying, from the dequantized image data, a highest column number in the rows of the dequantized image data at which a non-zero element is found and storing the highest column number as the row performance offset, wherein performing the row-wise IDCT comprises performing a set of arithmetic operations for each element on every row in the column-wise IDCT result data up to the highest column number stored as the row performance offset, said set of operations including one or more arithmetic operations for any zero element.

32. The method of claim 31, wherein generating the column performance array and generating the row performance offset comprises generating the column performance array and the row performance offset prior to performing the column-wise IDCT and the row-wise IDCT.

33. The method of claim 27, wherein generating the column performance array comprises identifying each row number having a last non-zero element based on zero-run length information.

34. A non-transitory computer readable medium storing a computer program which when executed by at least one processor of a computing device performs a two-dimensional inverse discrete cosine transform ("IDCT") to produce image data from a block of dequantized image data arranged in rows and columns, said computer program comprising sets of instructions for:

receiving the dequantized image data produced as a result of an inverse quantization process;

generating, from the dequantized image data, a column performance array comprising an array element for each particular column of the dequantized image data, wherein said set of instructions for generating comprises a set of instructions for traversing, for each particular column of the dequantized image data, each row from a last row to a first row of the particular column in order to identify a row number of a last non-zero element for the particular column, and storing the identified row number of the last non-zero element as the array element for the particular column in the column performance array;

performing a column-wise IDCT upon the dequantized image data to produce column-wise IDCT result data based on the generated column performance array; and performing a row-wise IDCT upon the column-wise IDCT result data.

35. The non-transitory computer readable medium of claim 34, wherein the computer program further comprises a set of instructions for generating a row performance offset by identifying a last column number at which a non-zero element is found from the column-wise IDCT result data, wherein performing the row-wise IDCT comprises performing the row-wise IDCT in accordance with the row performance offset.

36. The non-transitory computer readable medium of claim 34, wherein the computer program further comprises a set of instructions for generating a row performance offset by identifying a last column number at which a non-zero element is found from the dequantized image data, wherein performing the row-wise IDCT comprises performing the row-wise IDCT in accordance with the row performance offset.

37. A method for performing a two-dimensional inverse discrete cosine transform ("IDCT") on a computing device, said IDCT producing image data from a block of dequantized image data arranged in rows and columns, said method comprising:

at the computing device:

generating a row performance array for the dequantized image data, said row performance array specifying a plurality of offsets that each determines a number of arithmetic operations for a particular row of the dequantized image data, wherein said generating comprises:

for each particular row of the dequantized image data, identifying a column number at which a last non-zero element is found and storing the identified column number in the row performance array;

performing a row-wise IDCT directly upon the dequantized image data to produce row-wise IDCT result data by performing, for each particular row of the dequantized image data, the number of arithmetic operations for each column of the dequantized image data up to a particular column specified by the corresponding column number stored in the row performance array; and performing a column-wise IDCT upon the row-wise IDCT result data to produce image data.

38. The method of claim 37 further comprising generating a column performance offset by identifying a last row number at which a non-zero element is found from the row-wise IDCT result data, wherein performing the column-wise IDCT comprises performing the column-wise IDCT in accordance with the column performance offset.

39. The method of claim 37 further comprising generating a column performance offset by identifying a last row number at which a non-zero element is found from the dequantized image data, wherein performing the column-wise IDCT comprises performing the column-wise IDCT in accordance with the column performance offset.

* * * * *